United States Patent Office 3,666,623
Patented May 30, 1972

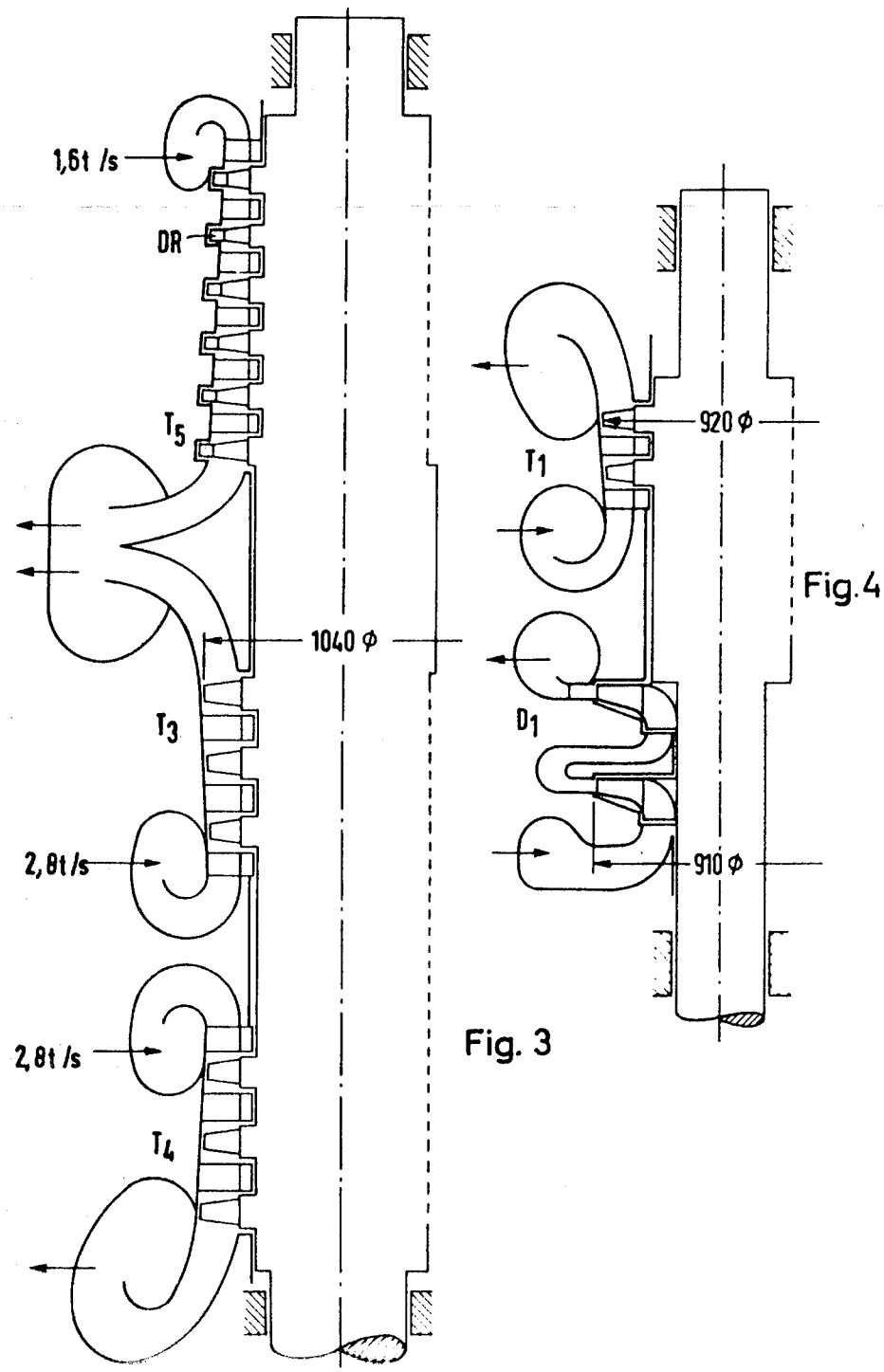

3,666,623
GAS TURBINE INSTALLATION FOR NUCLEAR POWER PLANT
Elmar Harand and Hans-Peter Schabert, Erlangen, Germany, assignors to Siemens Aktiengesellschaft, Berlin and Munich, Germany
Filed Aug. 23, 1968, Ser. No. 755,008
Claims priority, application Germany, Aug. 26, 1967, P 16 01 656.1
Int. Cl. G21c 15/18
U.S. Cl. 176—60            12 Claims

ABSTRACT OF THE DISCLOSURE

Gas turbine installation for operating with a gas having characteristics deviating considerably from those of an ideal gas, particularly for a nuclear power plant with gas-cooled reactor, includes compressor means normally operating at a given rotary speed so as to provide a given flow-through rate of the gas at a given pressure, and means utilizing released after-heat power for providing emergency or after-cooling subsequent to cut-off of the heat source or of the reactor by considerably increasing the rotary speed of the compressor means so as to provide an increased flow-through rate of the gas at a considerably reduced pressure approximating an ideal gas.

Figure 1:
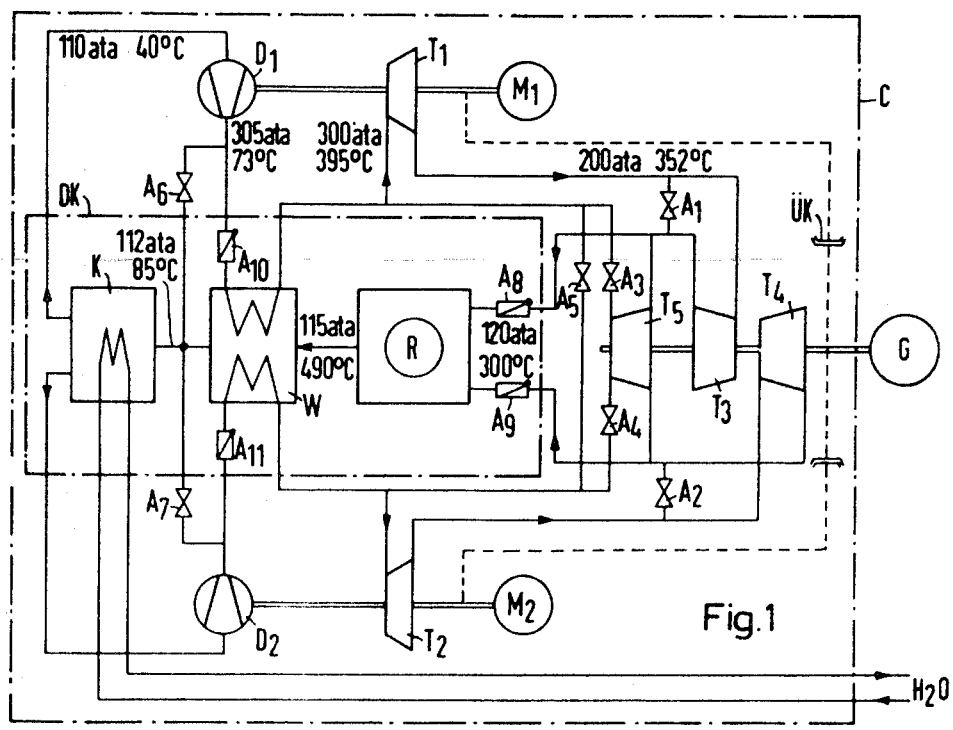

Our invention relates to gas turbine installation for power plant and more particularly to gas turbine installation for nuclear power plant.

Increased attention has been given recently to gas turbine installations for power plant primarily because the conception of a heavy-water nuclear power plant with $CO_2$ cooling has been shown to be advantageous. With heavy water as cooling medium, efficiencies of more than 30% can be attained even for moderate reactor-outlet temperatures of about 500° C., if the condition or state of the gas at the compressor inlet is located in the vicinity of the critical point [ for$CO_2$:31° C. and 73 atmospheres absolute (ata.)], because at that point the density of the medium is almost as great as that of water. In copending application Ser. No. 651,876 of Hans-Peter Schabert, filed July 7, 1967, now patent 3,444,038 dated May 13, 1969 and assigned to the same assignee as that of the instant application, there is disclosed a proposal which results in especially small conduits and turbine dimensions. In this connection, supercritical $CO_2$ is easily compressed from 110 to about 300 ata. without intermediate cooling. The compressor power requirement is less than one-third the entire turbine output.

With gas turbine installations for such reactors and also for connection to other sources of hot gas having characteristics deviating considerably from those of an ideal gas, special consideration must be given to emergency cooling system because the removal of after-heat from the reactor core or from the heater must occur with a very great throughput volume or flow rate if the gas conduits should become leaky. When the circulatory loop springs a leak, the density of the coolant greatly diminishes and the characteristics thereof approximate those of an ideal gas. From a relative viewpoint, when a leak occurs, the density of the coolant drops more sharply in the compressor than in the reactor or in the turbine so that the compressor delivers too little coolant. One should therefore expect that it would be impossible to obtain satisfactory operation of one and the same gas turbine installation both during normal operation with a non-ideal gas as well as in emergency operation with an ideal gas.

The operating conditions in a case of emergency cooling are to be considered in the following embodiment or example of a $CO_2$-cooled reactor. The expression after-cooling refers to cooling during the normal operating conditions of a reactor that has been shut down, whereas the term emergency cooling relates to cooling after the occurrence of great damage, especially after a large leak has developed in the coolant circulating loop. Such leak causes a great pressure drop in the reactor, for example from 120 ata. to 4 ata. Within one to two minutes, this equilibrium pressure of 4 ata. is attained within the reactor safety structure or containment vessel.

After the reactor has been shut down, there is additionally accumulated a considerable quantity of heat in the fuel elements of the reactor. This accumulated heat must also be removed by the emergency cooling. If a weight flow rate or throughput of for example 3% of its original value is required for emergency cooling, a substantially constant volume throughput or flow rate is demanded in the reactor, and the volume throughput or flow rate in the compressor must increase considerably about a factor of 3.3 in the present example. This cannot, however, be achieved also with radial compressors of extremely flat characteristic curve or can be achieved only at a great loss in efficiency as long as the rotary speed provided by the generator is maintained. The compressor-turbine combination, due to improper adjustment, would then not run at all or would not run fast enough.

It is accordingly an object of our invention to provide gas turbine installation, particularly for nuclear power plants, which nevertheless utilizes the after-heat, by special means, as operating power. In gas turbine processes wherein the medium, for example helium, behaves as an ideal gas even during normal operation, this requirement would be even easier to fullfill.

With the foregoing and other objects in view we accordingly provide a gas turbine installation, particularly for nuclear power plant, having a gas-cooled reactor, wherein the gas turbine is operated with a gas having characteristics deviating considerably from those of an ideal gas. The gas turbine installation includes compressor means normally operating at a given rotary speed so as to provide a given flow-through rate of the gas at a given pressure, and means utilizing at least after-heat power for providing emergency cooling or after-cooling, subsequent to shut-down of a heat source or of the reactor, by considerably increasing the rotary speed of the compressor means so as to provide an increased flow-through rate of the gas at a considerably reduced pressure approximating an ideal gas. Consequently, the power necessary for providing the after-cooling or the emergency cooling is obtained entirely or for the most part from the after-heat, and additional auxiliary blowers are required only in special cases.

For safety's sake it is advisable to provide, in accordance with our invention, two compressors in the gas turbine installation so that emergency cooling can be ensured even when one of the compressors is inoperative.

In accordance with other features of our invention, the compressors can be provided with a characteristic curve, which affords a considerable increase in throughput or flow rate for the same rotary speed. For this purpose, adjustable guide vanes, entrance buckets or turbine blades are provided in accordance with the invention. Instead of these, however, or in addition thereto, it may also be desirable to render the compressor mechanically independent of the useful turbine. At least two compressor assemblies, independent of one another, would then be provided each having its own drive turbine and its own starting motor. The compressor assemblies run in normal operation with a part of the cooling medium, and during emergency cooling operation with the entire pressure drop and/or weight throughput or flow rate of the cooling medium. To increase the rotary speed of the compressor assemblies during the emergency cooling operation, the useful turbine is shut down, bypassed or short-circuited, depending upon whether it is connected in parallel or in series with the drive turbine of the compressor assembly. If the useful turbine is provided with taps or bleeders, the resistance of the last stage is so small under certain conditions that short-circuiting is not required.

In order to maintain the peripheral speed of the compressor assembly during the emergency cooling operation below a permissible value, a radial compressor is provided, for example in two-stage form and the drive turbine is constructed so that the rotary speed thereof does not exceed the limits necessary for maintaining the mechanical strength even for extreme pressure differences, for example after a break in a conduit, while the velocity of sound in the gas is attained prior thereto (filling or clogging limit).

A determining factor in the construction of the drive turbine in the compressor assembly is that it has relatively good efficiency also during emergency cooling or after-cooling operation with ideal gas, thus running in essence with its own force. If one desired to adjust the drive turbine of the compressor assembly even better to the characteristics in the emergency cooling or after-cooling operation, it can be constructed for a small pressure drop so that no adequate rotational power is applied during normal operation. The drive turbine is then supplemented by a turning moment which is transmitted from the useful turbine to an overhauled coupling whereby each compressor assembly is then normally coordinated with its own useful turbine.

Other features which are considered as characteristic for the invention are set forth in the appended claims.

Although the invention is illustrated and described herein as embodied in gas turbine installation for nuclear power plant, it is nevertheless not intended to be limited to the details shown, since various modifications and structural changes may be made therein without departing from the spirit of the invention and within the scope and range of equivalents of the claims.

Figure 2:
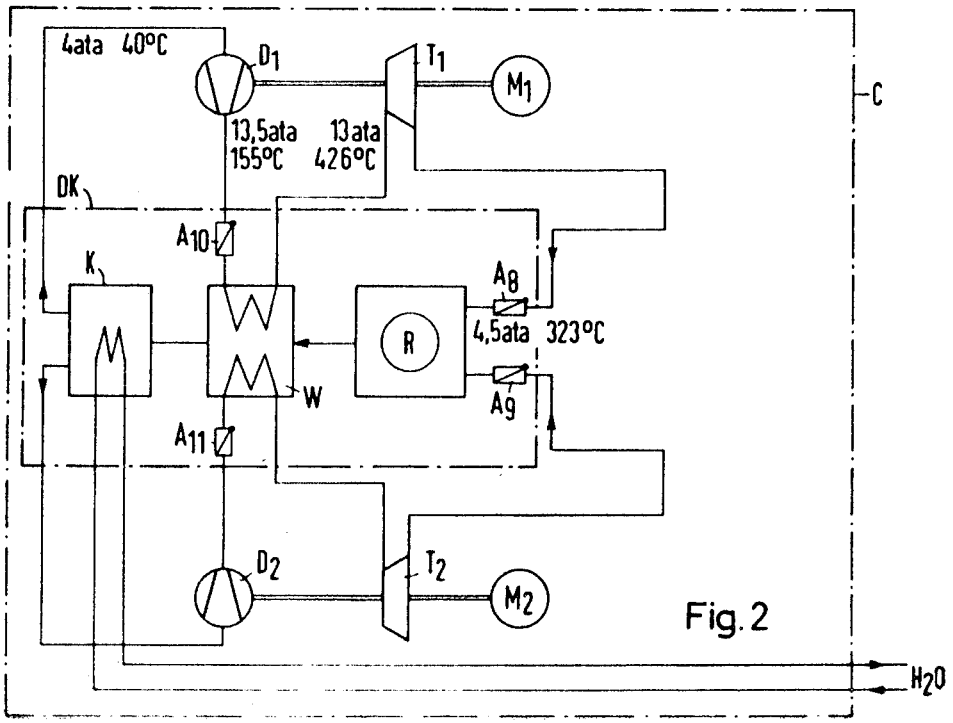

The construction of the invention, however, together with additional objects and advantages thereof will be best understood from the following description of specific embodiments when read in connection with the accompanying drawings, in which:

FIGS. 1 and 2 are schematic circuit diagrams of a nuclear power plant during normal and emergency cooling operation respectively; and FIGS. 3 and 4 are diagrammatic cross sectional views respectively of the useful turbine and of the compressor assembly shown schematically in FIG. 1.

Referring now to the drawings and particularly first to FIG. 1, there is shown schematically a nuclear power plant having a reactor R and a useful turbine having the stages $T_3$, $T_4$ and $T_5$ connected to a generator G having an output of about 500 mwe. Within the reactor vessel DK represented by the dot-dash line and preferably formed of prestressed concrete there are located the reactor R, a recuperative heat exchanger W and a cooler K (integrated structure). The cooling medium $CO_2$ passes from reactor R into the heat exchanger W where it is cooled and therefrom into the cooler K where it is further cooled. The cooling medium $CO_2$ then proceeds to two compressors $D_1$, $D_2$, forming part of respective compressor assemblies with drive turbine $T_1$ and starting motor $M_1$ on the one hand and drive turbine $T_2$ and starting Motor $M_2$ on the other. The compressor assembly and the useful turbine which form the gas turbine installation are located outside of the pressure vessel DK yet however within the reactor containment vessel C. The carbon dioxide conduits between the assemblies located inside and outside the pressure vessel are advantageously thermally insulated on the inside of the pressure vessel and, if necessary, additionally cooled on the outside in order to reduce stresses and obviate the necessity for compensating elements. In order to obviate greater cooling medium losses in the event of damage, self-locking valves, throttling members or the like can be provided. As is obvious from the data relating to the condition of the gas as indicated in FIG. 1, the cooling medium is compressed without intermediate cooling in the compressor, thereafter heated in the heat exchanger W and fed to the drive turbines $T_1$ and $T_2$ and the useful turbine having a high pressure stage $T_5$ and low pressure stages $T_3$ and $T_4$. Naturally, additional useful turbine with coordinated compressor assemblies are connectable to a reactor of suitable construction.

With a power plant of 500 mwe., the drive turbines of the compressor assembly can have, for example, a power input of about 108 mw. and can rotate with 3250 r.p.m. During normal operation they only receive part of the available pressure drop (100 ata.) and weight throughput or flow rate, while the remainder is supplied to the turbine providing useful output. The valves $A_1$ and $A_2$ are closed during normal operation and the valves $A_3$ and $A_4$ are open. The bypass valves $A_6$ and $A_7$ serve for regulating and for start-up. The check valves $A_8$ through $A_{11}$ function primarily during inoperative condition of individual compressor assemblies or in the event of a break in a conduit. The bypass valve $A_5$ can be used during start-up of one operating compressor assembly while the second compressor assembly is already operative. If a break in a conduit in the coolant circulatory loop should then occur, a great pressure drop is produced in the reactor, for example from 120 ata. to 4 ata. and the reactor is shut down. At the reduced pressure, the $CO_2$ in circulatory loop behaves substantially as an ideal gas which conveys the after-heat power of the reactor to the compressor assembly and thereby ensures the maintenance of the cooling operation.

The circuit of the gas turbine installation during emergency cooling is indicated in FIG. 2. It is readily noted that all of the pressure drops that still remain and all of the coolant throughput of the reactor are connected to the drive turbines $T_1$ and $T_2$ of the respective compressor assemblies. The valves $A_1$ and $A_2$ are open, while valves $A_3$ and $A_4$ are closed.

The compressor is of the two-stage radial type in order to produce the required more-than-triple volumetric flow circulating output due to its substantially double rotary speed and, additionally, due to its relatively flat characteristic curve. A slight loss in efficiency occurs both in the compressor as well as in the drive turbine; in the latter due to the fact that there is too small a pressure drop for the rotary speed thereof. Nevertheless, with turbine inlet temperature indicated in FIG. 2, the required rotary speed can be attained and the increased resistance of the circulatory loop during emergency operation can be overcome. Thus, the reactor can be successfully cooled essentially with its own after-heat power and, in fact, not only after the equilibrium pressure of 4 ata. has been attained, but rather immediately within the first critical seconds after occurrence of a leak in the cooling conduits.

In the further course of the emergency cooling operation, the development of after-heat in the reactor reduces further, as well as the rotary speed of the compressor assembly, accordingly. The reactor cooling then reverts to the condition of normal after-cooling for a largely pressure-less reactor. The starting motors can be connected to the power lines, for example about a day after the reactor has been shut down, in order to be able to reduce the temperature in the reactor to the level which will still be adequate for driving the turbines. Such extraneous cooling is required, for example, when effecting repairs in the reactor or when replacing fuel rods.

To avoid obliterating details pertinent to the invention of this application, the cooling water flow system and the oil-feed system for the compressor assemblies are not illustrated in the schematic diagrams of FIGS. 1 and 2. For operating these non-illustrated systems, extraneous energy sources may be utilized under certain conditions.

As shown in FIG. 1, both compressor assemblies $T_1$, $D_1$ and $T_2$, $D_2$ can be connected through overhaul-couplings UK to the useful turbine $T_3$, $T_4$, $T_5$. In normal operation, the compressor assemblies are driven by the useful turbine. In emergency cooling operation, when the useful turbine is at rest, the drive turbines $T_1$ and $T_2$ of the respective compressor assemblies run in the operative condition for which they are constructed. The gas turbine installation can thus be given such construction that it is possible to be operated with the gas having different values of pressure and temperature than those given in FIGS. 1 and 3.

The useful turbine is shown in FIG. 3, and the compressor assembly in FIG. 4, both in a somewhat diagrammatic view. The unusually small dimensions as compared to conventional steam turbines is readily noted from the figures. This is due to the relatively high density of the medium. Due to the relatively high pressure differences between stages and the relatively short length of the vanes, it is desirable to place sealing rings DR on the ends of the vanes so that they are rotatable therewith, in order to provide improved sealing. This is capable of being accomplished without difficulty and technically with considerable reliability primarily for the useful turbines due to their relatively low peripheral velocity.

It is again noted that the aforedescribed and illustrated gas turbine installation need not be connected to a reactor having the indicated pressure levels. The maintenance of an emergency cooling system is also required for other generators of a hot gas flow when accidents occur in the conduits through which the gas is circulated. As an example, reference is made to heating to a relatively high pressure level, for instance in a heater that is connected to a sodium-cooled fast breeder reactor.

Though it is also fundamentally possible to mount the compressors $D_1$ and $D_2$ on the shaft of the useful turbine $T_3$, $T_4$, $T_5$ and thereby dispense with both drive turbines $T_1$ and $T_2$, nevertheless, the structures shown in FIGS. 1 and 2, wherein separate shafts are used for driving the compressors, afford various advantages. In particular, the construction of FIGS. 1 and 2 permits better adjustment of the compressor throughput or flow rate and of the pressure conditions in the compressor with respect to the demand of the useful turbine operating at constant rotary speed, especially if the $CO_2$ content of the system is reduced and/or the cooler outlet temperature is increased in order to attain a favorable partial load efficiency. During start-up and after-cooling, the start-up motor need not drag the heavy generator along with it. Since the generator is at rest, the sealing of its shaft in the opening of the wall of the containment vessel or structure C, through which it extends, is much simplified in the event of damage. Moreover, when the load of the generator is reduced, the advantage is derived therefrom that the coolant flow in the reactor can be maintained, while the gas flow in the useful turbine is interrupted with the aid of a rapidly closing valve (not illustrated in FIG. 1), in order to protect the generator from an increase in the rotary speed of more than 20%. The valves $A_1$ and $A_2$ are coupled at first to some extent with the rapid close-down valve, and are thereafter fully opened, so that no unsteadiness in the reactor cooling is produced. It is possible, however, to attain the limit of rotary speed by simultaneously opening the useful turbine bypass fully and the compressor bypass partially so that non-illustrated rapidly closing valves for the turbine stages $T_3$ and $T_4$ which produce the pressure loss, are dispensed with.

We claim:
1. Gas turbine installation for use with a heat source comprising a nuclear power plant having a gas-cooled reactor adapted to release after-heat power subsequent to shut-down thereof following development of a leak in the cooling system thereof, the installation operating with a gas having chaarcteristics deviating relatively greatly from an ideal gas, comprising compressor means normally operating at a given rotary speed so as to provide a given partial flow of the gas through a cooling system for the heat source at a given pressure, and turbine means operatively connected to said compressor means and utilizing the released after-heat power for increasing said given rotary speed of said compressor means for increasing, in turn, the given partial flow of the gas through said cooling system to total flow therethrough at a relatively greatly reduced pressure approximating an ideal gas, so as to provide added cooling.

2. Gas turbine installation according to claim 1, wherein said compressor means comprises at least two compressors having guide vanes and rotary blades relatively adjustable for increasing said given partial flow.

3. Gas turbine installation according to claim 2, wherein said compressors are radial compressors.

4. Gas turbine installation according to claim 2, wherein said compressors are axial compressors.

5. Gas turbine installation according to claim 1, including a useful turbine and at least two compressor assemblies independent of said useful turbine and of one another, each of said compressor assemblies including a drive turbine and a starting motor operable normally at part of the pressure drop of the coolant gas through said cooling system and operable in emergency to provide said added cooling at full pressure through said cooling system.

6. Gas turbine installation according to claim 5, wherein said drive turbines are constructed only for pressure drops available in the emergency operation thereof and being driven along by said useful turbine through an overhaul coupling in the normal operation thereof.

7. The combination of a gas turbine installation according to claim 5, with a heat exchanger connected in said cooling system downstream of the reactor, each of said compressor assemblies having a respective group of conduits coordinated with said heat exchanger.

8. Gas turbine installation according to claim 5, wherein each of said compressor assemblies includes a compressor and is of such construction that, for extreme pressure differences, the velocity of sound is attained by the vanes of said drive turbine before critical rotary velocity of said compressor is attained.

9. Gas turbine installation for use with a heat source comprising a nuclear power plant having a gas-cooled reactor adapted to release after-heat power subsequent to shutdown thereof following development of a leak in the cooling system thereof, the installation operating with a gas having characteristics deviating relatively greatly from an ideal gas, comprising compressor means normally operating at given rotary speed so as to provide a given partial flow of the gas through a cooling system for the heat source at a given pressure, and turbine means operatively connected to said compressor means and utilizing the released after-heat power for increasing said given rotary speed of said compressor means for increasing, in turn, the given partial flow of the gas through said cooling system to total flow therethrough at a relatively greatly reduced pressure approximating an ideal gas, so as to provide added cooling, said turbine means including a useful turbine and at least two compressor assemblies independent of said useful turbine and of one another, each of said compressor assemblies including a drive turbine and a starting motor operable normally at part of the pressure drop of the coolant gas through said cooling system and operable in emergency to provide said added cooling at full pressure through said cooling system, each of said compressor assemblies including a compressor, and including bypass valves in said cooling system at said useful turbine for preventing damage to a generator driven by said useful turbine due to excessive rotary speed thereof at no-load condition, and other valves located in said cooling system at said compressor, said other valves being coupled to said bypass valves so that simultaneous actuation thereof assures controlled outflow of the coolant gas in the reactor.

10. Gas turbine installation according to claim 9, wherein said other valves are also bypass valves.

11. Gas turbine installation according to claim 9, wherein said other valves are fast shut-off valves.

12. Gas turbine installation according to claim 9, wherein said valves are coupled elastically.

References Cited

UNITED STATES PATENTS

| | | | |
|---|---|---|---|
| 3,091,582 | 5/1963 | Bradley | 176—60 |
| 3,300,389 | 1/1967 | Packman et al. | 176—60 |
| 3,322,640 | 5/1967 | Heathcote | 176—65 X |
| 3,377,800 | 4/1968 | Spillmann | 176—60 |
| 3,390,525 | 7/1968 | Spillman | 176—60 |
| 3,410,091 | 11/1968 | Fratschi | 176—60 |
| 3,431,168 | 4/1969 | Kiemtrup | 176—60 |
| 3,444,038 | 5/1969 | Schabert | 176—60 |

FOREIGN PATENTS

| | | | |
|---|---|---|---|
| 1,167,122 | 4/1964 | Germany | 176—60 |
| 1,447,567 | 6/1966 | France | 176—60 |

REUBEN EPSTEIN, Primary Examiner

U.S. Cl. X.R.

176—38, 65; 60—59 T, 36